United States Patent [19]

Chen et al.

[11] Patent Number: 5,051,214
[45] Date of Patent: Sep. 24, 1991

[54] DOUBLE-DECK DISTRIBUTOR AND METHOD OF LIQUID DISTRIBUTION

[75] Inventors: Gilbert K. Chen, Farmers Branch; Adam T. Lee, Richardson; Kuang-Yeu Wu, Plano; Gary W. Gage, Grand Prairie, all of Tex.

[73] Assignee: Glitsch, Inc., Dallas, Tex.

[21] Appl. No.: 547,395

[22] Filed: Jul. 3, 1990

Related U.S. Application Data

[63] Continuation of Ser. No. 296,838, Jan. 13, 1989, abandoned.

[51] Int. Cl.[5] .............................................. B01F 3/04
[52] U.S. Cl. .............................. 261/97; 261/DIG. 44
[58] Field of Search .................. 261/97, 98, 110, 111, 261/DIG. 44

[56] References Cited

U.S. PATENT DOCUMENTS

| | | |
|---|---|---|
| 1,987,881 | 1/1935 | Von Seggern et al. ..... 261/DIG. 44 |
| 2,582,826 | 5/1945 | Glitsch . |
| 2,609,888 | 9/1952 | Beringer ................................ 261/97 |
| 2,611,596 | 7/1953 | Glitsch . |
| 2,932,361 | 4/1960 | Beringer ................................ 261/97 |
| 3,008,553 | 1/1961 | Glitsch et al. . |
| 3,013,782 | 9/1961 | Glitsch . |
| 3,079,134 | 3/1963 | Winn . |
| 3,080,155 | 3/1963 | Glitsch et al. . |
| 3,087,711 | 11/1963 | Glitsch . |
| 3,146,609 | 9/1964 | Engalitcheff Jr. ..................... 261/97 |
| 3,233,708 | 10/1964 | Glitsch . |
| 3,273,872 | 9/1966 | Eckert ................................... 261/96 |
| 3,343,821 | 2/1967 | Winn et al. . |
| 3,360,246 | 12/1967 | Eckert ................................... 261/98 |
| 3,392,967 | 7/1968 | Eckert ................................... 261/97 |
| 3,589,689 | 6/1971 | English ................................ 261/114 |
| 3,959,419 | 5/1976 | Kitterman . |
| 3,969,447 | 7/1976 | Glitsch et al. . |
| 4,032,604 | 6/1977 | Parkinson et al. ................... 261/111 |
| 4,123,008 | 10/1978 | McClain . |
| 4,159,291 | 6/1979 | Bruckert et al. ................. 261/114 R |
| 4,198,002 | 4/1980 | McClain . |
| 4,264,538 | 4/1981 | Moore et al. . |
| 4,267,978 | 5/1981 | Manteufel ............................. 261/97 |
| 4,275,021 | 6/1981 | Kirkpatrick et al. .......... 261/114 JP |
| 4,472,325 | 9/1984 | Robbins . |
| 4,476,069 | 10/1984 | Harper et al. . |
| 4,479,909 | 10/1984 | Streuber . |
| 4,557,877 | 12/1985 | Hofstetter . |
| 4,579,692 | 4/1986 | Bugler III. et al. ......... 261/DIG. 44 |
| 4,597,916 | 7/1986 | Chen . |
| 4,604,247 | 8/1986 | Chen et al. . |
| 4,689,183 | 8/1987 | Helms et al. . |
| 4,729,857 | 3/1988 | Lee et al. . |
| 4,816,191 | 3/1989 | Berren et al. ......................... 261/97 |
| 4,842,778 | 6/1989 | Chen et al. . |

FOREIGN PATENT DOCUMENTS

| | | |
|---|---|---|
| 2945103 | 11/1979 | Fed. Rep. of Germany . |
| 3141930 | 10/1981 | Fed. Rep. of Germany . |
| 2319103 | 6/1976 | France . |
| 1047502 | 10/1983 | U.S.S.R. ................................ 261/97 |
| 668293 | 3/1952 | United Kingdom ....... 261/DIG. 44 |
| 2013510 | 8/1979 | United Kingdom . |

OTHER PUBLICATIONS

Chen, Gilbert K., *Chemical Engineering*, McGraw-Hill, Mar. 5, 1984, "Packed Column Internals", pp. 40–51.
Zanetti, Richard, *Chemical Engineering*, McGraw-Hill, May 27, 1985, "Boosting Tower Performance by More Than a Trickle", pp. 22–27.

*Primary Examiner*—Tim Miles
*Attorney, Agent, or Firm*—Johnson & Gibbs

[57] ABSTRACT

An improved liquid flow distributor assembly for a process column of the type wherein the distributor is positioned above a packing section for the distribution of liquid downwardly therethrough. The improvement comprises a plurality of distributor troughs constructed with a series of internal distributor channels having stilling plates depending therefrom. Each channel is constructed of a generally U-shaped cross section, aligned with and affixed to the distributor trough for providing primary liquid flow to intermediate regions thereof. In this manner, liquid gradients between opposite ends of the troughs are eliminated and a uniform quiescent liquid level is maintained.

3 Claims, 4 Drawing Sheets

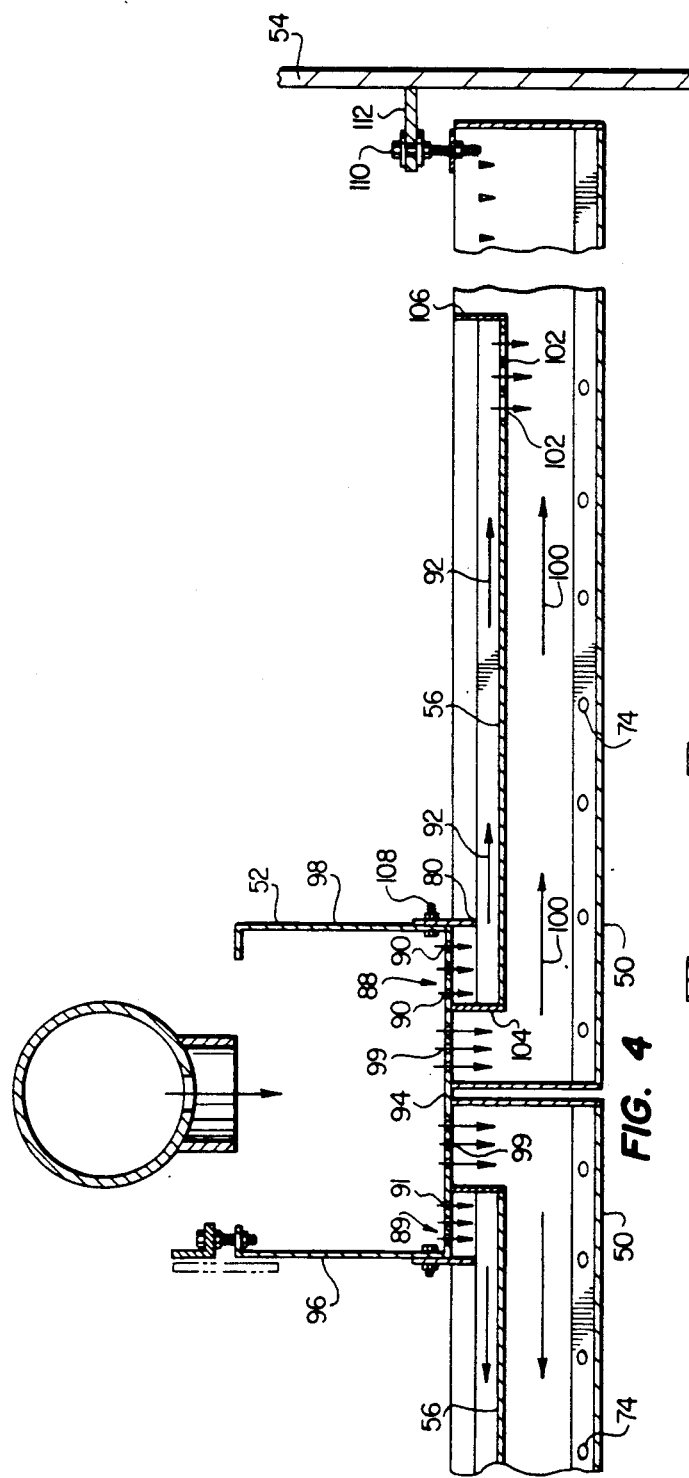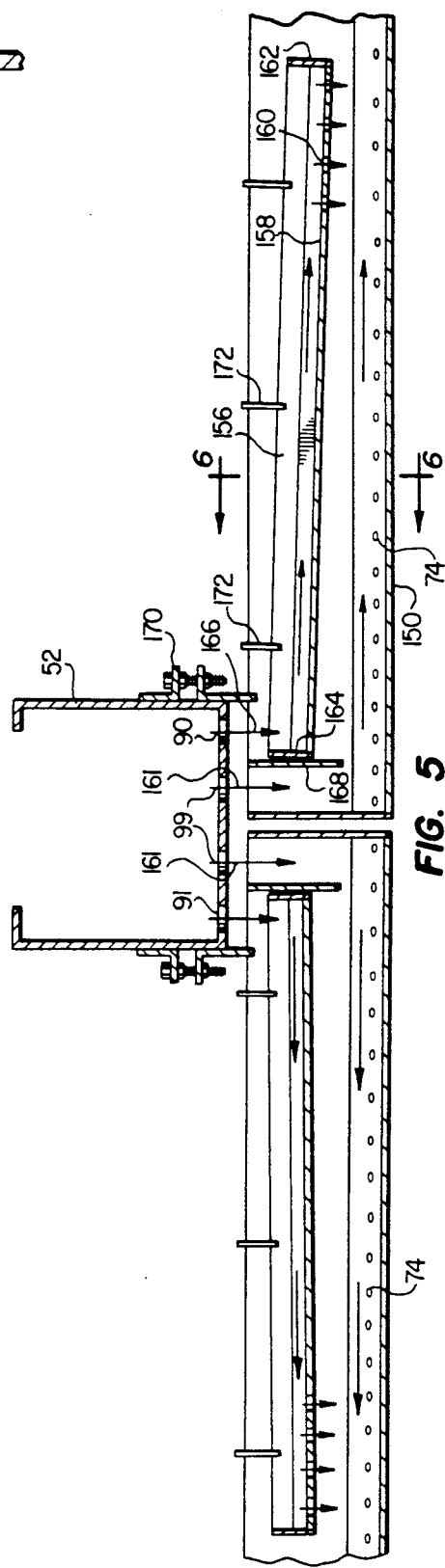

DOUBLE-DECK DISTRIBUTOR AND METHOD OF LIQUID DISTRIBUTION

This is a continuation of application Ser. No. 07/296,838, filed Jan. 13, 1989 now abandoned.

BACKGROUND OF THE INVENTION

1. Field of the Invention

The present invention pertains to liquid distributors for vapor-liquid contact towers and, more particularly, to an improved liquid distributor assembly for columns incorporating counter-current, vapor-liquid flow therethrough.

2. History of the Prior Art

It is well known in the prior art to utilize various types of exchange columns in which a gas and a liquid come into contact with one another, preferably in a counter-current flow for purposes of mass or heat transfer, close fractionation and/or separation of feed stock constituents, and other unit operations. Efficient operation requires mass transfer, heat transfer, fluid vaporization and/or condensation, whereby one of the fluids can be cooled with a minimum pressure drop through a particular zone or zones of minimum dimensions defining the area and volume thereof. These are pre-requisites for efficient operation and are necessary for close fractionation. For this reason, counter-current flow of vapor and liquid within such exchange columns have become established methods of such vapor-liquid contact in the prior art. The actual vapor-liquid interface requires the utilization of a packing bed positioned within the column. Liquid is then distributed atop the packing bed in the most feasible manner while vapor is distributed beneath the packing bed in the lower region of the tower. In this manner, liquid trickling downwardly through the packing bed is exposed to, and in contact with, the vapor ascending therethrough for vapor-liquid contact and interaction.

It is well established that the configuration of the packing bed determines the pressure drop, the efficiency of the vapor-liquid interface and the concomitant mass and energy transfer occurring in a process tower. The means for effective and even distribution of the vapor and the liquid on opposite ends of the packing bed as well as the means for maintenance of that distribution therethrough are critical to an efficient operation. Only with efficient initial vapor and liquid distribution and with the maintenance of such distribution throughout the packing bed will homogenous mixing zones be created therethrough for maximizing the efficiency therein. Efficiency in a column is directly related to the cost of operation and the production quality. For this reason, a myriad of prior art packing designs have been prevalent in conventional exchange columns. The efficiency of the packing is, however, limited to a large extent by the efficiency of the vapor and liquid distribution thereacross. For example, failure of either vapor or liquid to evenly distribute over cross sections of the packing effectively eliminates the utility or usefulness of that part of the packing where there is poor or no distribution. This phenomena, in turn, directly reduces the efficiency of the tower and decreases the cost effectiveness of the operation. The depths of the packing bed are critical in establishing production criteria and can affect the operational costs. Failure to evenly distribute vapor-liquid and/or maintain homogeneity within the packing bed can lead to serious consequences, particularly in the petroleum refining industry.

Aside from the packing beds themselves, the liquid distributor is the most important unit of a tower internal. Failure in performance of a packed tower sometimes stems from liquid distribution problems such as clogging or uneven distribution. Thus, the selection of a correct liquid distributor is critical for uninterrupted plant operation. Operational considerations thus include the functional aspects of the distributor, such as how level the distributor troughs are maintained, how well the floor is equalized therethrough, and how the liquid is distributed to the troughs so that a substantially uniform liquid level is maintained. The latter point is particularly true in process towers of large diameter where the parting box and distributor troughs are themselves very long and liquid gradients have been established between opposite ends of the troughs.

Conventional liquid distributors generally include the multi-orifice spray head variety adapted for dispersing liquid in the form of a spray atop a packing bed. In the utilization of dump packing wherein a plurality of random oriented packing elements are disposed within the exchange column, such a liquid distribution technique, is sometimes effective. This is true particularly when high efficiency parameters are not of critical significance. However, in the event of high efficiency packing such as that set forth in U.S. Pat. No. 4,604,247 assigned to the assignee of the present invention, means for homogenous liquid and gas distribution are of extreme importance.

The cost of high efficiency packing of the type set forth in the aforesaid patent commands attention to proper vapor-liquid distribution. Even small regions of non-homogenous interaction between the vapor and liquid is an expensive and wasteful loss not consistent with the utilization of high efficiency packing, where space and homogeneity in vapor-liquid interface are both expected and necessary for proper operation. High efficiency packing of the state of the art varieties set forth and shown in the aforesaid U.S. patent requires counter-current vapor-liquid flow through the channels defined by opposed corrugations of sheets disposed therein. If the initial liquid or gas distribution fails to enter a particular corrugation pattern, then precious surface area is lost in the packing until the liquid and vapor are urged to migrate into and interact through the unfilled regions of the packing. Only by utilizing proper vapor and liquid distribution means may effective and efficient utilization of high efficiency packing, as well as conventional dumped packing, be assured.

The development of systems for adequate liquid distribution in process towers has been limited as set forth above. In the main, it is known to discharge and distribute liquids with spray orifices, supply pipes, perforated plates, apertured troughs and nozzles. Gas is concomitantly discharged in an ascending turbulent configuration to provide adequate vapor distribution. Although many prior art systems are generally effective in distributing some vapor and some liquid to most portions of the packing bed, uniform distribution thereacross is usually not obtained without more sophisticated distribution apparatus. For example, unless gas is injected into a myriad of contiguous areas beneath the packing bed with equal pressure in each area, the mass flow of vapor upwardly through the packing bed will not be uniform. Random vapor discharge simply distributes unequal amounts of vapor across the lower regions of the packing bed but does not in any way assure equality in the distribution. Likewise the simple spray of liquid atop the packing bed, though intended to be effective in wetting all surface areas, often results in high concentrations of liquid flow in certain packing bed areas and less concentrations of liquid flow in others. This unevenness, of course, depends on the spray device. Orifice distributors are generally more susceptible to plugging than other types of distributors, and plugging tends to be non-uniform leading to uneven irrigation within the tower. Surface irregularities in a distributor pan occurring during manufacture will, likewise, increase flow resistance and induce liquid level gradients. With a level gradient, the fluid head between holes varies and the flow of fluid from those holes is not uniform. This is a distinct disadvantage. Any flow irregularity which focuses the flow in one area while reducing flow in other areas is deleterious.

Other structural and functional features of process columns can contribute to flow irregularity. These features include the size and shape of the distributor troughs, steps taken to maintain uniform fluid level in said troughs, and the means by which fluid is distributed to said troughs. The most conventional fluid distribution technique includes the use of a relatively large central channel called a parting box. The parting box is disposed above the distributor troughs and receives the initial flow of fluid from a supply pipe. The fluid enters the parting box and flows therefrom into the distributor troughs. If the parting box is located at one end of a very long distributor trough, as in a large diameter process tower, a fluid gradient can be created simply by virtue of the flow resistance imparted by the side walls of the trough and the discharge of liquid therefrom through the apertures in the trough. The result is reduced liquid flow rates from the ends of the trough and high liquid flow rates from the region of the trough near the parting box. Such liquid gradients resulting in loss of fluid head toward the ends of the parting box can be addressed in part by utilizing secondary parting boxes at intermediate positions between the center diameter of the tower and the ends of the elongate troughs. This does, however, require additional metal in fabrication as well as other structural and functional considerations in the manufacture thereof.

Structured packing can tolerate very little maldistribution, while dump packing can sustain relatively large variations in liquid distribution. Unfortunately, the manifestation of uneven liquid distribution often occurs in the vicinity of the most even, or uniform, vapor distribution. This is because vapor has had a chance to more evenly distribute through the packing bed prior to engaging the liquid distribution flow. It would be an advantage, therefore, to provide means for even liquid and vapor distribution prior to entry of said vapor as well as liquid into the packing bed and in a manner providing both a uniform spread of said liquid as well as vapor and uniform volumetric distribution thereof.

The present invention provides such an improved system of vapor-liquid distribution through a liquid distributor assembly incorporating primary distributor channels disposed within the parting box and/or certain distributor troughs. Primary liquid distribution may therein be provided in the parting box and/or troughs through decked or "piggy-back" channels which carry the primary liquid flow to thereby reduce both the potential fluid gradient and the variable liquid head that would ordinarily plague such systems. In this manner, the advantages of uniform flow distribution may be provided in an assembly facilitating a low profile configuration, minimum material costs and reduced labor costs such as welding, within the tower.

SUMMARY OF THE INVENTION

The present invention pertains to liquid distribution systems adapted for uniformly distributing liquid flow through a process tower. More particularly, one aspect of the invention comprises an improved liquid distributor for process columns of the type wherein vapor is injected into the column for ascension therethrough and liquid is dispersed in the column for downward flow. Packing sections, or beds, are disposed in the tower for facilitating the interaction of vapor and liquid passing in counter-current flow therethrough. The improvement comprises a liquid flow distributor adapted for positioning above the packing section for the even distribution of liquid downwardly therethrough. The distributor comprises a parting box and/or troughs having a plurality of primary flow channels disposed therein. Each primary flow channel is affixed to the parting box or distributor trough to thereby permit at least partial primary flow distribution therefrom. In this manner, a more uniform liquid level may be maintained in the distributor trough than ordinarily feasible with a fluid level entry at one end.

In another aspect, the present invention relates to an improved liquid distributor and a method for a process column of the type wherein a distributor trough receives liquid flow from a parting box and distributes the flow downwardly to packing beds therebeneath. The improvement comprises a primary flow channel disposed within the distributor trough and positioned in flow communication with the parting box. The primary flow channel is secured relative to the distributor trough and constructed for disseminating flow into the trough from the parting box for enhanced uniformity. The primary flow channel may be secured to the distributor trough and/or disposed therein. The primary flow channel is constructed of a length on the order of one-half the length of the particular distributor trough to which it is secured for discharging flow therefrom into regions such as the mid span of the trough. The channel may be positioned in axial alignment or in an angular relationship relative to the trough for discharging fluid therein at an imparted velocity.

The distributor trough described above may also be constructed with a plurality of apertures formed therein for facilitating the even distribution of liquid flow into the distributor trough. The primary flow channel may also be constructed of a length substantially equivalent to the length of the distributor trough or on the order of one-half of the length distributor trough.

BRIEF DESCRIPTION OF THE DRAWINGS

For a more complete understanding of the present invention and for further objects and advantages thereof, reference may now be had to the following description taken in conjunction with the accompanying drawings in which:

FIG. 4 is an enlarged, side elevational, cross-sectional view of the liquid flow distributor trough array of FIG. 2 taken along lines 4—4 thereof;

FIG. 5 is an enlarged, side elevational, cross-sectional view of an alternative embodiment of the trough of FIG. 4;

DETAILED DESCRIPTION OF THE PREFERRED EMBODIMENT

Figures 1, 3:
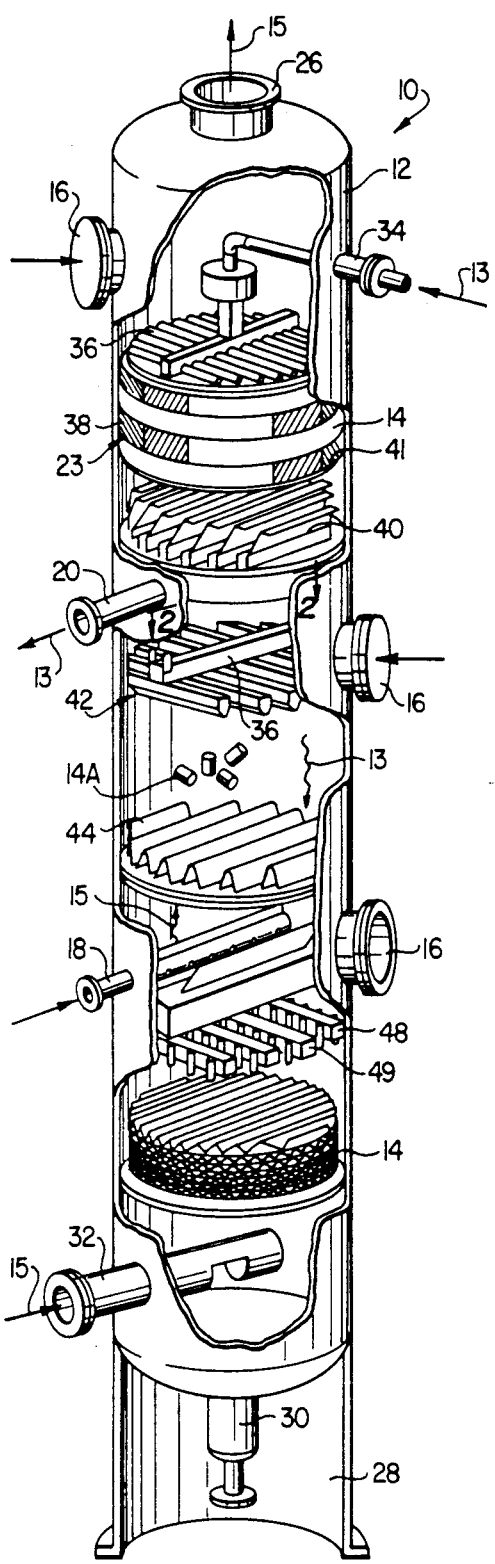
FIG. 1 is a perspective view of a packed column with various sections cut away for illustrating a variety of tower internals and one embodiment of a liquid flow distributor trough constructed in accordance with the principles of the present invention disposed therein.
FIG. 3 is an enlarged, end elevational, cross-sectional view of the liquid flow distributor trough array of FIG. 2 taken along lines 3—3 thereof.

Referring first to FIG. 1, there is shown a perspective view of a packed exchange tower or column with various sections cut away for illustrating a variety of internals and the utilization of one embodiment of the liquid distributor of the present invention. The exchange column 10 of FIG. 1 comprises a cylindrical tower 12 having a plurality of packing bed layers 14 disposed therein. A plurality of manways 16 are likewise constructed for facilitating access to the internal region of the tower 12 for replacement of the packing beds 14. Also provided are side stream draw off line 20, liquid side feed line 18, and side stream vapor feed line or reboiler return line 32. A reflux return line 34 is provided atop the tower 10.

In operation, liquid 13 is fed into the tower 10 through reflux return line 34 and side stream feed input feed line 18. The liquid 13 flows downwardly through the tower and ultimately leaves the tower either at side stream draw off 20, or at bottom stream draw off line 30. In its downward flow, the liquid 13 is depleted of some material which evaporates from it as it passes through the packing beds, and is enriched or added to by material which condenses into it out of the vapor stream.

Still referring to FIG. 1, the exchange column 10 further includes a vapor outlet, overhead line 26 disposed atop the tower 12 and a lower skirt 28 disposed in the lower region of the tower around bottom stream takeoff line 30 coupled to a reboiler (not shown). Reboiler return conduit 32 is shown disposed above the skirt 28 for recycling vapor therein upwardly through the packing layers 14. Reflux from condensers is provided in the upper tower region 23 through entry conduit 34 wherein reflux is distributed throughout a liquid distributor 36 across upper packing bed 38. It may be seen that the upper packing bed 38 is of the structured packing variety. The regions of the exchange column 10 beneath the upper packing bed 38 are shown for the purpose of illustration and include a liquid collector 40 disposed beneath a support grid 41 in support of the upper structured packing 38. A liquid distributor 42, adapted for redistributing liquid 13, is likewise disposed there-beneath and an intermediate support plate 44 is provided in an alternative configuration of the type adapted for supporting random packing 14A of either a ring or a saddle variety as representatively shown. Another liquid distributor 48 is disposed beneath plate 44 and comprises a plurality of troughs 49. The distributor 48 is constructed in an alternative embodiment utilizing a tube assembly set forth and described in detail in U.S. patent application Ser. No. 266,886, assigned to the assignee of the present invention and incorporated herein by reference. It may be seen from this figure that the counter-current configuration between the ascending vapor 15 and the descending liquid 13 is the subject of a plurality of critical design considerations including liquid/vapor ratios, liquid cooling, foaming and the presence of solids or slurries therein. Corrosion is likewise a consideration of the various elements in the packed towers and the selection of the material in the fabrication of the tower internals is in many instances the results of such considerations. The anatomy of the packed column as shown in FIG. 1 is likewise described in more detail in an article by Gilbert Chen entitled "Packed Column Internals" appearing in the Mar. 5, 1984 edition of Chemical Engineering, incorporated herein by reference.

Figure 2:
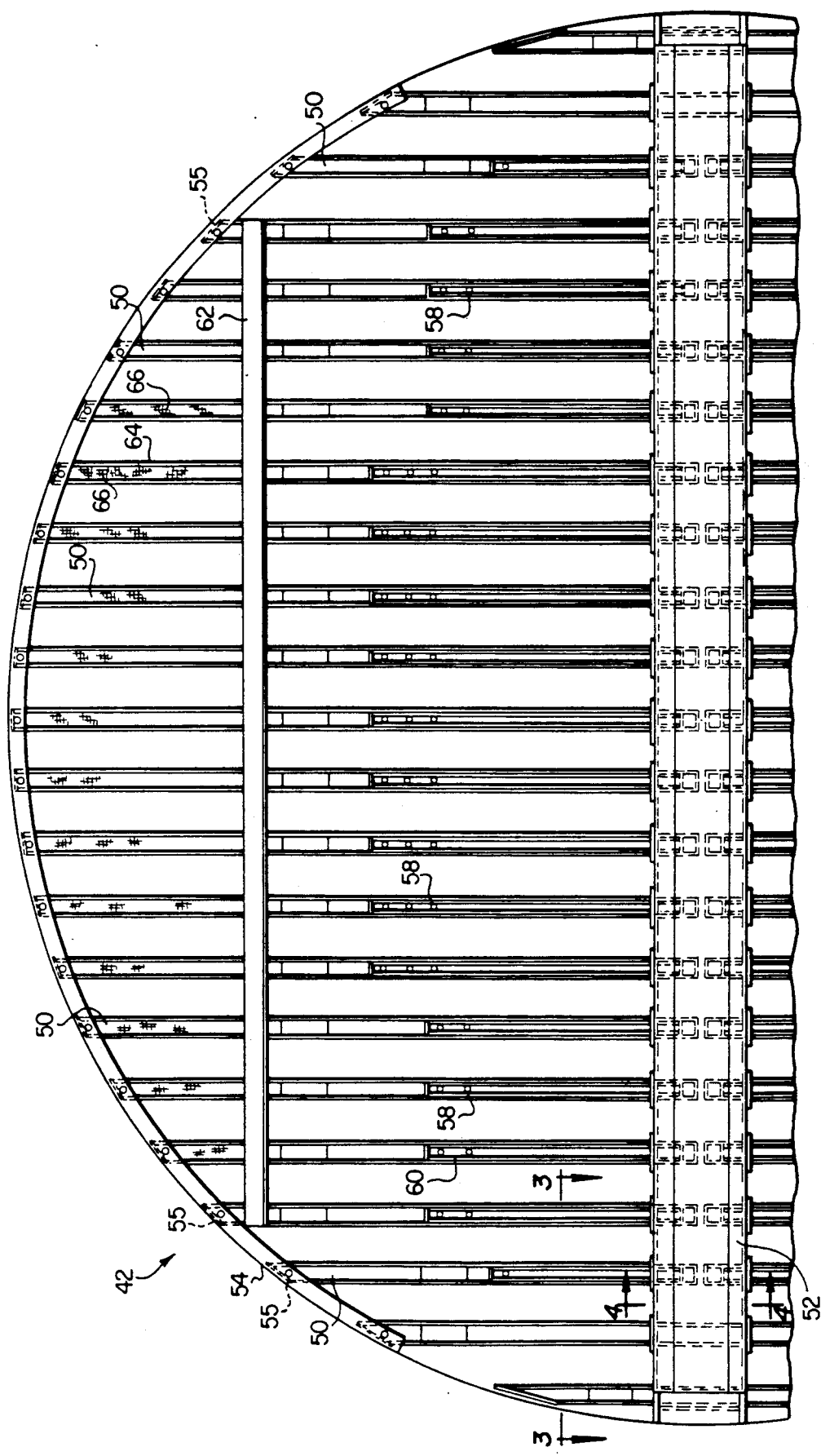
FIG. 2 is an enlarged, top plan view of the process tower of FIG. 1 taken along lines 2—2 thereof and showing one embodiment of a distributor trough array and parting box assembly constructed in accordance with the principles of the present invention.

Referring now to FIG. 2, there is shown an enlarged, top plan view of a parting box distribution assembly and distributor trough array (referred to collectively as the distributor 42) constructed in accordance with the prinicples of the present invention. The distributor 42 is comprised of a plurality of distributor troughs 50 spaced one from the other in generally parallel spaced relationship. Each distributor trough 50 is disposed in flow communication with and orthogonal to, a parting box 52. Parting box 52 is secured in the central portion of the tower 12, across the diameter thereof, and each distributor trough 50 has one end disposed therebeneath to receive the fluid flow. Each distributor trough 50 extending from beneath the parting box 52 terminates adjacent to the cylindrical round wall 54 of the tower 12. Most troughs 50 have angular end sections 55 to accommodate the curvature of wall 54. The angular relationship of each section 55 relative to each trough 50 varies depending on its position in the tower as shown in FIG. 2. Also shown in FIG. 2 is the positioning of an upper, "piggy-back" trough 56 serving the function of a primary flow channel extending away from the parting box 52. Each flow channel 56 is constructed with a plurality of apertures 58 and positioned in the respective trough 50 for providing even fluid flow therein, as described in more detail below. In this manner, an improved liquid flow distribution can be acheived in a process column.

Still referring to FIG. 2, each trough 50 is secured within the tower 12 by a series of structural elements. A first structural beam 62 is shown affixed to each trough 50 in securement thereto. Likewise, each trough 50 is secured to the parting box 52 as shown in more detail below. It may be seen that the region 64 of each trough 50 extending beyond the upper flow channel 56 is covered by a wire mesh 66. The length of the wire mesh 66 for each trough 50 varies depending upon its position in the tower 12.

Referring now to FIG. 3, there is shown an enlarged, end elevational view of several of the troughs 50 of FIG. 2 taken along lines 3—3 thereof. Each trough 50 of this particular embodiment includes vertical side walls 68 terminating in angulated side walls 69 and 70.

A bottom 72 is formed thereacross above which apertures 74 are formed in the side walls 69 and 70. Emergency overflow apertures 76 are formed in a V-shaped configuration in the vertical side walls 68 of the trough 50. In the uppermost region 78 of the trough 50, the upper trough, or primary flow channels 56 are secured. In this particular configuration, the upper flow channels 56 are positioned within, and secured directly to, the trough 50. A mounting plate 80 is secured therebehind providing means for direct securement to the parting box 52.

Still referring to FIG. 3, the upper trough 56 includes generally parallel side walls 82 terminating in angulated side walls 83 and 84 which themselves terminate in the bottom 86. A plurality of apertures are formed in the bottom region 86 as described in more detail below. It is through the apertures 86 that fluid flowing from the parting box 52 into the primary flow channel, or channels, 56 is distributed downwardly and uniformly into the trough 50 thereby permitting a generally uniform flow therein at a liquid level having a generally uniform head for even distribution and fluid flow from apertures 74. Obviously, other mounting configurations as well as designs for upper channel 56 are possible. These include the stilling plates shown in FIG. 6 and several others shown in more detail below.

Referring now to FIG. 4, there is shown an enlarged side elevational cross-sectional view of the trough 50 and parting box 52 of FIG. 2. The primary flow channel, or upper trough, 56 is shown secured within trough 50 in a position contiguous to outer portion 88 of parting box 52. In outer portion 88, a plurality of apertures 90 are formed to allow flow directly from the parting box 52 into the primary flow channel 56. Arrows 92 illustrate this flow configuration. Parting box 52 may thus be seen to be constructed with a bottom section 94 formed between side wall sections 96 and 98. Within the bottom section 94 the apertures 90 are formed in outer parting box regions 88 and 89. On the left side of parting box, apertures 91 are formed in the region 89 for a fluid flow communication with the primary flow channel 56 disposed therebeneath. Internally to the outwardly disposed apertures 90 and 91 are inwardly disposed apertures 99 which provide a direct flow communication for the parting box 52 to the troughs 50. It is in this manner that many troughs of the prior art were directly fed with liquid for counter-current flow distribution. In the present embodiment, the primary flow channel 56 is disposed beneath the bottom surface 94 of the parting box 52 and outer regions 88 and 89 thereof to thereby be positioned in a flow communication with apertures 90 and 91 while receiving a primary fluid flow therein. In this manner, flow can be directly communicated to select regions including intermediate portions of the respective troughs 50.

Still referring to FIG. 4, there is shown a select flow pattern of fluid from parting box 52 into troughs 50 represented by arrows 100. It is this flow which permits direct fluid feed to the parting box 50 for the regions of the trough 50 immediately adjacent thereto. The secondary feed from primary flow channel 56 is provided through apertures 102 formed in select regions thereof and particularly in the distal end of primary flow channel 56 as shown in FIG. 4. Each end of the primary flow channel 56 of this particular embodiment is constructed with end caps 104 and 106. End cap 104 is disposed immediately beneath the parting box 52 with end cap 106 disposed at the opposite end thereof. In this manner, all liquid flow from the primary flow trough 50 occurs through the apertures 102. It should be noted that the size, quantity and location of the apertures 102 are not limited to that shown herein. Any aperture configuration is possible, including the absence of apertures and the removal of end plate 106. Moreover, more than one primary flow channel 56 may be utilized in a single trough 50 for providing primary flow distribution at multiple locations therewithin.

Still referring to FIG. 4, it may be seen that securement of the distributor troughs 50 is facilitated by connections at opposite ends thereof. Adjacent to the parting box 52, securement flange 80 is secured by a bolt assembly 108. At the opposite end of trough 50, a second bolt assembly 110 is utilized for securement of the trough 50 to a tray support ring 112 which is itself secured to the tower shell 54. In this manner, the fluid level within the respective troughs 50 may be selectively maintained in accordance with the principles of flow therein established by utilizing both the primary flow channel 56 and the direct feed of the trough 50 from the parting box 52. As stated above, a myriad of flow distribution configurations are possible with the present invention including the absence of direct flow from the parting box 52 into the trough 50 through apertures 99.

The purpose of the present invention is to facilitate the uniform distribution of liquid in and from the trough 50 to apertures formed therein. By maintaining the uniform liquid level through the utilization of the primary flow channel, or upper trough, 56 that will carry fluid to locations remote in the trough 50 relative to the parting box 52, primary flow channel 56 thus functions as an extension of said parting box.

Referring now to FIG. 5, there is shown yet an alternative embodiment of the primary flow channel distributor, or upper trough, 56 of FIG. 4. Parting box 52 of FIG. 5 is disposed above troughs 150 having a primary flow channel 156 assembled therein. Primary flow channel 156 is constructed with a bottom surface 158 having apertures 160 formed in the end thereof. First end plate 162 is secured adjacent to the apertures 160 with a second end plate 164 secured adjacent to parting box 52. Apertures 90 thus provide direct fluid flow as represented by arrows 166 into primary flow channel 156. Arrows 161 represent flow through apertures 99 of fluid directly into trough 150. A baffle 168 is shown adjacent to arrow 161 for preventing the spray of fluid into primary flow channel 156. The mounting of this particular assembly is modified as shown herein by utilizing a bracket assembly 170 providing adjustability in the vertical positioning of the trough 150 relative to the parting box 52. A plurality of support members 172 are included in direct assembly with trough 156 for securement to trough 150. This provides the requisite stability for fluid flow therethrough. It may be seen that this particular fluid flow configuration will afford the direct flow of fluid through apertures 90 at a greater rate than that provided in the configuration shown in FIG. 4. As stated above, a wide variety of angular configurations is contemplated relative to the bottom surface 158 of primary flow channel 156. Angular variations will have a similar impact upon the amount of fluid flow distributed therewith and such angular variation may be sized relative to the size of aperture 90 and the size of parting box 52.

Figure 6:
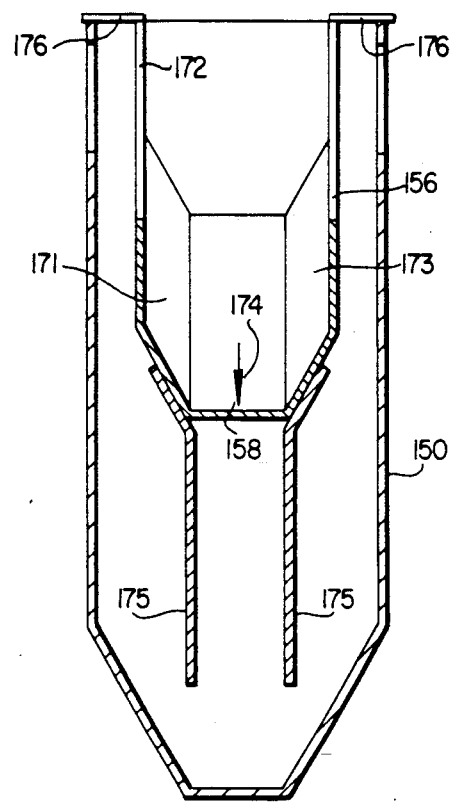
FIG. 6 is an enlarged, end elevational, cross-sectional view of the liquid flow distributor trough of FIG. 5 taken along lines 6—6 thereof.

Referring now to FIG. 6, there is shown an enlarged end elevational view of the distributor trough 150 of FIG. 5 and the primary flow channel 156 constructed therein. The primary flow channel 156 includes angulated side walls 171 and 173 terminating in bottom 158. The slope of bottom surface 158 illustrated by the arrow 174 affords the increased fluid velocity and distribution from the parting box 52 in accordance with the principles of the present invention. Side walls 172 comprise vertical sections which are connected to trough 150 by mounting members 176. Also shown in this view are stilling plates 175 which depend from the channel 176 to still fluid distributed in trough 150. These plates reduce splashing of the liquid and promote uniform liquid flow. Plates 175 may also be incorporated into the other channel constructions shown herein.

Figure 7:
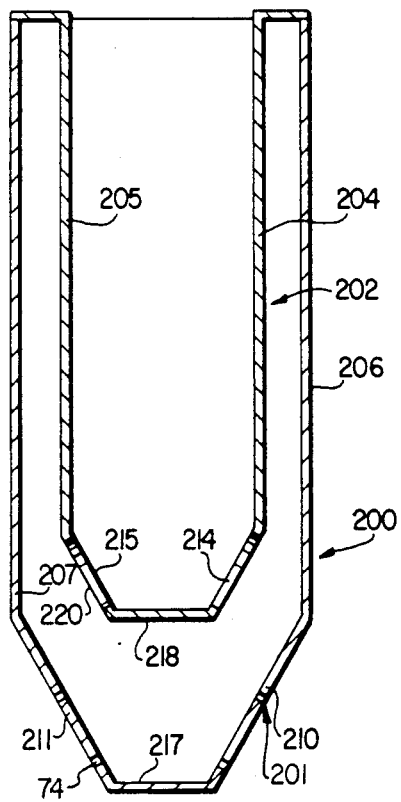
FIG. 7 is an enlarged, end elevational, cross sectional view of yet another alternative embodiment of a liquid distributor trough constructed in accordance with the principles of the present invention.

Referring now to FIG. 7, there is shown an alternative embodiment of the construction of a primary flow channel and distributor trough assembly. Trough assembly 200 is thus comprised of a primary flow channel 202 directly mounted therein. Primary flow channel 202 is constructed with side walls 204 and 205 which are in generally parallel spaced relationship with side walls 206 and 207 of distributor trough 200. Likewise, the angulated side wall regions 210 and 211 of distributor trough 200 are disposed in generally parallel relationship with side wall regions 214 and 215 of primary flow channel 202. A bottom wall 217 in distributor trough 200 is disposed in generally parallel spaced relationship with a bottom surface 218 of primary flow channel 202. Apertures 220 are selectively spaced in the angulated side walls 214 and 215 of primary flow channel 202 to thereby distribute flow therefrom into distributor trough 200. The hole pattern 201 of distributor trough 200 may be in accordance with any particular applications and may include not only a baffled distributor configuration such as that set forth and shown in U.S. Pat. No. 4,729,857, dated Mar. 8, 1988, and assigned to the assignee of the present invention, and incorporated herein by reference.

Figure 8:
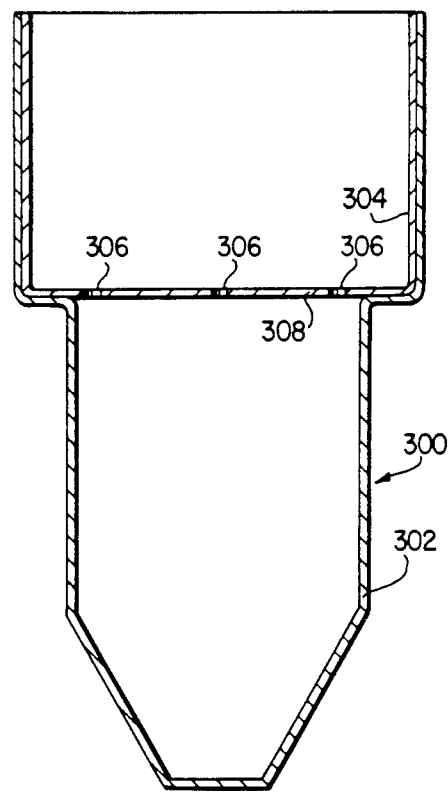
FIG. 8 is an enlarged, end elevational, cross-sectional view of a further alternative embodiment of a liquid distributor trough or parting box constructed in accordance with the principles of the present invention.

FIG. 8 illustrates yet another embodiment of a flow distribution assembly 300 constructed in accordance with the principles of the present invention. Assembly 300 includes a lower trough 302 contiguous to, and depending from, an upper trough 304. Upper trough 304 is constructed with a plurality of apertures 306 in a bottom wall 308 thereof for permitting the select flow of fluid therefrom. This particular configuration illustrates yet another embodiment of an upper and lower flow channel in a liquid distribution network. The channels herein represented by section 302 and section 304 may be assembled in a variety of angular relationships and interengagements. Flow from the upper channel to the lower channel may be provided by either apertures, vents, orifices, end caps or the absences thereof and/or combinations thereamong. Likewise, the cross sectional configuration of the respective troughs and/or channels may vary depending on the particular application and fluid flow requirements. These applications may include the utilization of the primary flow channel aspect not only in distributor troughs but also in the parting boxes of the type set forth and described above. In utilizing a parting box, the aspect of fluid flow may be incorporated to maintain uniformity and fluid equilibrium between sections and parting box in a tower of relatively large diameter. The principles of the present invention may thus be seen to be applicable to any distribution system for liquid in a process tower suffering from the potential problem of non-uniform liquid levels due to the length of travel of fluid flow for distribution.

It is thus believed that the operation and construction of the present invention will be apparent from the foregoing description. While the method and apparatus shown or described has been characterized as being preferred it will be obvious that various changes and modifications may be made therein without departing from the spirit and scope of the invention as defined in the following claims.

What is claimed is:

1. An improved liquid distributor for a process column of the type wherein a plurality of distributor troughs receives liquid flow from a liquid source for establishing a liquid level within said troughs and distributing said flow downwardly to packing beds therebeneath, said improvement comprising:

a primary flow channel disposed within at least one of said distributor troughs in general axial alignment therewith, substantially above the liquid level therein and positioned in flow communication with said liquid source;

said primary flow channel being secured relative to said distributor trough in which it is disposed, substantially above the liquid level therein and constructed for disseminating flow above said liquid level and into said trough from said liquid source for enhanced uniformity at relatively high mass flow volume therealong, and said primary flow channel being integrally formed with said distributor trough and said distributor further including at least one stilling plate secured to and depending from said flow channel into said trough.

2. An improved method of liquid flow distribution in a packed tower of the type wherein liquid flow is dispersed from a liquid source through a plurality of distributor troughs having a liquid level established therein onto a packing bed disposed therebeneath, wherein said improvement comprises the steps of:

forming a primary flow channel adapted for being received in at least one of said distributor troughs in general axial alignment therewith;

disposing said primary flow channel in said distributor trough in which it is disposed in an exposed position substantially above the liquid level therein;

securing said primary flow channel in said distributor trough substantially above the liquid level and in flow communication with said liquid source for the distribution of liquid flow therein at relatively high mass flow volumes;

constructing at least one stilling plate for securement to said flow channel; and affixing said plate to said channel for depending therefrom and into said trough.

3. A liquid distribution system for process columns comprising:

a primary liquid supply;

a plurality of flow distribution troughs disposed in flow communication with said supply for establishing a liquid level therein;

a plurality of primary flow channels disposed upon said troughs, substantially above the liquid level therein and in axial alignment and in flow communication therewith; and means coupling said primary flow channels to said fluid supply for permitting said fluid flow through said primary flow channels into said troughs therebeneath for maintaining the uniform liquid level therein;

said troughs comprising distributor troughs positioned beneath and in flow communication with said primary liquid supply through said primary flow channel, said distributor troughs having said primary flow channels secured thereto beneath said primary liquid supply; and said distributor troughs further being positioned beneath said primary liquid supply to receive partial liquid flow directly therefrom and with said primary flow channels secured beneath said primary liquid supply to also receive partial liquid flow therefrom for distributor to said distributor trough at at least one point distant from said primary liquid supply.

* * * * *